United States Patent
Urbanski et al.

(10) Patent No.: US 11,237,720 B2
(45) Date of Patent: Feb. 1, 2022

(54) COMMAND CONTROL SYSTEM OF A COMMANDED SYSTEM VIA A GRAPHIC INTERFACE AND ASSOCIATED CONTROL METHOD

(71) Applicant: THALES, Courbevoie (FR)

(72) Inventors: Guillaume Urbanski, Mérignac (FR); Alain Cordonnier, Mérignac (FR); Hélène Misson, Mérignac (FR); Sylvain Lapuyade, Mérignac (FR); Maxime Caillaud, Mérignac (FR)

(73) Assignee: THALES, Courbevoie (FR)

( * ) Notice: Subject to any disclaimer, the term of this patent is extended or adjusted under 35 U.S.C. 154(b) by 176 days.

(21) Appl. No.: 16/597,197

(22) Filed: Oct. 9, 2019

(65) Prior Publication Data

US 2020/0110523 A1 Apr. 9, 2020

(30) Foreign Application Priority Data

Oct. 9, 2018 (FR) .................................... 18 01068

(51) Int. Cl.
| | |
|---|---|
| *G06F 3/0488* | (2013.01) |
| *G01C 23/00* | (2006.01) |
| *G06F 3/01* | (2006.01) |
| *G06F 3/0481* | (2013.01) |
| *G06F 3/0484* | (2013.01) |
| *G08G 5/00* | (2006.01) |

(52) U.S. Cl.
CPC ......... *G06F 3/0488* (2013.01); *G01C 23/005* (2013.01); *G06F 3/016* (2013.01); *G06F 3/04815* (2013.01); *G06F 3/04847* (2013.01); *G08G 5/0021* (2013.01); *G08G 5/0034* (2013.01)

(58) Field of Classification Search
CPC .... G06F 3/0488; G06F 3/016; G06F 3/04815; G06F 3/04847; G01C 23/005; G08G 5/0021; G08G 5/0034
USPC ................................................ 345/173; 701/2
See application file for complete search history.

(56) References Cited

U.S. PATENT DOCUMENTS

| | | |
|---|---|---|
| 10,595,660 B2 * | 3/2020 | Patadia ................ A47J 27/0804 |
| 2009/0037033 A1 | 2/2009 | Phillips et al. |
| 2012/0197439 A1 | 8/2012 | Wang et al. |

(Continued)

OTHER PUBLICATIONS

French Search Report, from the French Patent Office in counterpart French Application No. 1801068, dated Jul. 9, 2019.

*Primary Examiner* — Prabodh M Dharia
(74) *Attorney, Agent, or Firm* — Arent Fox LLP

(57) ABSTRACT

This control subsystem comprises a first control subsystem comprising a first computing module able to acquire interaction data describing the interactions of the operator, associate these interaction data with a command, and generate a command signal corresponding to this command. The system further comprises a second control subsystem comprising a first computing module able to acquire the command signal, verify the compatibility of the command corresponding to the command signal with an operational context and, when the command is compatible with the operational context, generate a confirmation signal, and a third control subsystem able to acquire the command signal and the confirmation signal, and consolidate these signals to command the commanded system.

12 Claims, 4 Drawing Sheets

(56) References Cited

U.S. PATENT DOCUMENTS

2015/0346722 A1* 12/2015 Herz .................... G05D 1/0027
                                                          701/2
2016/0284182 A1*  9/2016 Havens ................. G08B 15/00
2016/0290119 A1* 10/2016 Tunc .................. G05B 19/0421
2017/0291691 A1   10/2017 Barral et al.
2017/0337226 A1* 11/2017 Bliss .................... G06F 16/185

* cited by examiner

COMMAND CONTROL SYSTEM OF A COMMANDED SYSTEM VIA A GRAPHIC INTERFACE AND ASSOCIATED CONTROL METHOD

CROSS-REFERENCE TO RELATED APPLICATIONS

This application claims priority to French Patent Application No. 18 01068, filed Oct. 9, 2018. The disclosure of the priority application is incorporated in its entirety herein by reference.

FIELD OF THE INVENTION

The present invention relates to a command control system of a system commanded via a graphic interface.

The present invention also relates to a control method associated with this control system.

The invention is applicable to any technical field whose need is to develop a command via a graphic man-machine interface while guaranteeing a high operating safety objective. Thus, the invention remains applicable in particular in the avionics, aerospace, medical or nuclear fields.

BACKGROUND OF THE INVENTION

Different methods are known in the state of the art for developing commands making it possible to control the operation of a system in a critical environment while guaranteeing a high level of integrity of these commands.

Thus for example, in the avionics field, in a carrier of the airplane or helicopter type, the commands of avionics systems are generally done by physical control devices such as buttons, rotator controls, switches, etc.

The advantage of such control devices is that each of them is physically independent of the others. Thus, if one of them fails, it has only a small impact on the operating safety of the carrier and remains circumscribed to a portion of the commanded subsystem.

However, a solution based on physical control devices encounters its limitations in terms of ergonomics, progress, bulk and costs.

In particular, regarding ergonomics, the large number of systems to be commanded for example in an aircraft make the ceiling panel of the cockpit particularly full, therefore leading to complexity. This complexity can result, during moments of stress, in usage errors of these devices, and therefore command errors. Furthermore, oftentimes, these control devices are located outside the normal viewing area of the pilot, which is not optimal in terms of workload or optimal in terms of perception of work.

Regarding progress, physical control devices limit the automation or execution of commands by another system.

One solution to simplify the control of the different systems therefore consists of replacing physical control devices with a man-machine interface for example displayed on an avionics screen. This transformation operation of the physical control devices into different types of graphic interactors available on a screen is called virtualization.

The difficulty of virtualization of the control devices is related to the level of operating safety that they must satisfy. A piece of equipment that sends incorrect commands to command systems, for example a cutoff of all of the fuel supply valves upon takeoff of an aircraft, would have harmful consequences for flight safety. The system generating the command must therefore be thought out to prevent malfunctions and confine the consequences of any failure.

As a result, currently, virtualization is done for control devices for which incorrect, lost or untimely commands have no serious consequences on the environment in which the commanded systems operate.

Thus, for example, in the avionics field, virtualization is used for control devices for which incorrect, lost or untimely commands lead to an event at most of the "MAJOR" type within the meaning of regulation CS 25.1309. In particular, according to this regulation, an event of the "MAJOR" type must not cause anything more than extra work for the crew and discomfort for passengers.

SUMMARY OF THE INVENTION

The present invention aims to propose a control means that makes it possible to retain the advantages of a graphic command interface of the system while guaranteeing a high operating safety level.

In particular, for the avionics field, the control system according to the invention makes it possible to guarantee the "HAZARDOUS" integrity level and, if needed, the "CATASTROPHIC" level of the generated commands.

To that end, the invention relates to a command control system of a system commanded via a graphic interface by an operator, the commanded system operating in a critical environment, the control system comprising:
  a first control subsystem comprising a first computing module able to acquire interaction data describing the interactions of the operator related to the graphic interface, associate these interaction data with a command, and generate a command signal corresponding to this command;
  a second control subsystem comprising a first computing module able to acquire the command signal, verify the compatibility of the command corresponding to the command signal with an operational context defining the operation of the critical environment and, when the command is compatible with the operational context, generate a confirmation signal corresponding to this command; and
  a third control subsystem able to acquire the command signal and the confirmation signal, and to consolidate the signals in order to generate a resultant command signal intended to command the commanded system.

According to other advantageous aspects of the invention, the control system comprises one or more of the following features, considered alone or according to all technically possible combinations:
  the first control subsystem further comprises one or several second computing modules, the or each second computing module being able to acquire said interaction data, associate these interaction data with a command, and generate another command signal corresponding to this command;
  the first computing module of the second control subsystem is able to acquire all of the command signals generated by the first control subsystem, and when these command signals correspond to a same command, to verify the compatibility of this command with the operational context;
  the second control subsystem further comprises a second computing module independent of the first computing module and able to execute the same tasks as the first computing module of the second control subsystem, the second computing module of the second control subsystem then being able to generate another confirmation signal;

the third control subsystem is able to acquire all of the confirmation signals coming from the second control subsystem and to select one of these confirmation signals to consolidate it with the command signal;

the third control subsystem is able to generate the resultant command signal when the command signal and the confirmation signal to be consolidated correspond to a same command;

in case of failure of the second control subsystem, the third control subsystem is able to generate the resultant command signal from the acquired command signal, without consolidation with a confirmation signal;

the first computing module of the first control subsystem is integrated into a computer implementing the operation of the graphic interface;

the third control subsystem is integrated in the commanded system;

at least one interaction of the operator in connection with the graphic interface is done on a screen displaying this graphic interface;

the commanded system is a system on board an aircraft; and the operational context is defined as a function of the flight phase of the aircraft and operating states of the on board systems.

The invention also relates to a command control method of a system commanded via a graphic interface by an operator, the commanded system operating in a critical environment. The control method comprises: acquiring interaction data describing each interaction of the operator with the graphic interface, associating these interaction data with a command and generating a command signal corresponding to this command; verifying the compatibility of the command corresponding to the command signal with an operational context defining the operation of the critical environment; when the command is compatible with the operational context, generating a confirmation signal corresponding to this command; and consolidating the command signal and the confirmation signal in order to generate a resultant command signal intended to command the commanded system.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
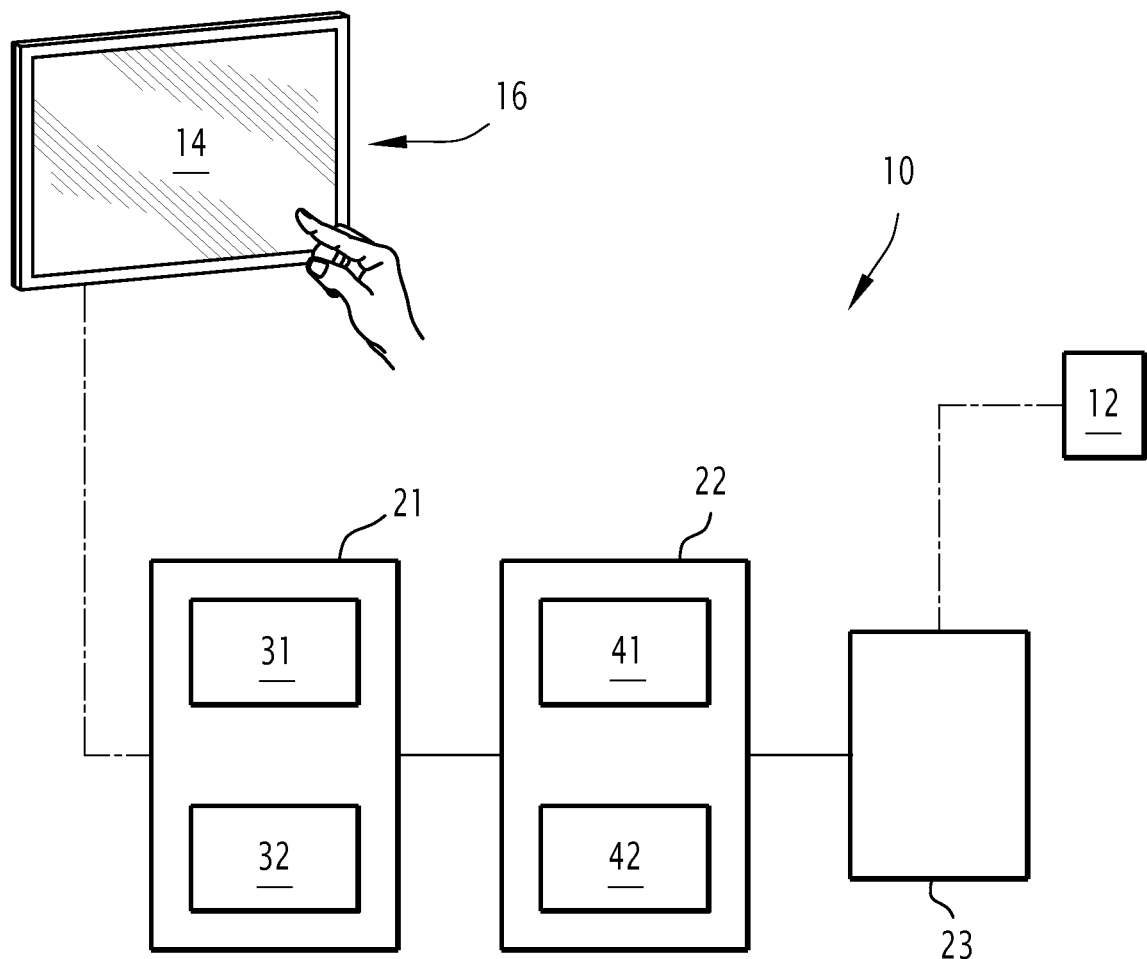
FIG. 1 is a schematic view illustrating a control system according to one exemplary embodiment of the invention.

The control system 10 of FIG. 1 makes it possible to control commands suitable for a commanded system 12.

In the example described below, the commanded system 12 is a system on board an aircraft and for example having a fuel supply system for the engines of the aircraft. This system is known in itself and in particular comprises a plurality of pumps circulating fuel toward the engines.

The aircraft can be piloted by a pilot from a cockpit arranged inside the latter (case in particular of an airplane and a helicopter) or from a remote cockpit (case in particular of a drone).

In general, however, it must be understood that the control system 10 makes it possible to control commands suitable for any other commanded system guaranteeing a high operating safety objective and operating in any other critical environment.

Thus, for example, according to other exemplary embodiments of the invention, the critical environment has a spatial vehicle, a land-based vehicle (in particular a rail vehicle), a medical device, a nuclear facility, etc.

Furthermore, in the example described below, for simplicity reasons, the control system 10 makes it possible to control commands suitable for a single commanded system. In general, however, it must be understood that the control system 10 makes it possible to control commands suitable for several types of commanded systems.

As illustrated in FIG. 1, the commanded system 12 is commanded by the pilot via a graphic interface 14. Thus, the commands suitable for the commanded system 12 are at least partially virtualized.

The graphic interface 14 is for example displayed on a display screen 16 arranged in the cockpit of the aircraft. This screen 16 corresponds to one of the screens already existing in the cockpit or then to a screen specially designed to command one or several on board systems.

The pilot interacts with the graphic interface 14 using one or several interaction devices.

In the described example, these interaction devices are presented by a mouse (or any other pointing device) and a device for detecting tactile movements on the screen 16. In other words, in the described example, the screen 16 is a touch-sensitive screen.

The interaction devices are capable of generating interaction data following each interaction performed by the pilot in relation to the graphic interface 14. These interaction data then describe the interactions performed by the pilot.

In reference to FIG. 1, the control system 10 according to the invention comprises a first control subsystem 21, a second control subsystem 22 and a third control subsystem 23.

The first control subsystem 21 comprises a first computing module 31 able to acquire the interaction data generated by the interaction devices, associate these interaction data with a command, and generate a command signal corresponding to this command.

The first computing module 31 is for example integrated into a graphic computer implementing the operation of the graphic interface 14. Thus, the first computing module 31 at least partially assumes the form of software implemented by this computer and/or a programmable logic circuit of the FPGA type (field-programmable gate array).

In the example of FIG. 1, the first control subsystem 21 further comprises a second computing module 32 making it possible to develop another command signal from same interaction data for comparison purposes and the second control subsystem 22 with that developed by the first computing module 31.

In particular, like the first computing module 31, the second computing module 32 is able to acquire the interaction data generated by the interaction devices, associate these interaction data with a command, and generate a command signal corresponding to this interaction.

The second computing module 32 is integrated into a computer independent of that of the first computing module 31. Like in the previous case, this second computing module 32 at least partially assumes the form of software and/or a programmable logic circuit of the FPGA type.

In reference to FIG. 1, the second control subsystem 22 comprises a first computing module 41 able to acquire all of the command signals coming from the first control subsystem 21, analyze these signals, and when they correspond to a same command, to verify the compatibility of this command with the operational context of the aircraft.

The first computing module 41 is integrated into an independent computer of each of the computers usable by the first control subsystem 21 and for example takes the form of software and/or a programmable logic circuit of the FPGA type.

The operational context of the aircraft is defined by a plurality of parameters representing the current flight phase of the aircraft and the operating states of all of the on board systems therein. Each state may for example correspond to a normal operating state, a downgraded operating state or a failing state.

The operational context of the aircraft may further be defined by any other parameter affecting the components of the aircraft and/or its piloting.

Thus, for example, these parameters may depend on current and/or future weather conditions around the aircraft, the remaining fuel, the destination, the flight time to the destination, the approach procedure, etc.

The verification of the corresponding command with the operational context of the aircraft is done for example by using a database stored in the computer integrating the first computing module 41.

This database for example contains a list of authorized (or unauthorized) commands as a function of the value and the possible combination of each parameter making up the operational context of the aircraft.

Thus, when the corresponding command is (or is not) found in such a list, the first computing module 41 is able to authorize the command and to generate a confirmation signal of the command corresponding to this command. Otherwise, it is able to prohibit this command by a prohibition signal.

In general, for the avionics application, the first computing module 41 is able to prohibit any command or a group of commands leading to an event of the "HAZARDOUS" or "CATASTROPHIC" type in the current operational context of the aircraft.

Advantageously, and as illustrated in FIG. 1, the second control subsystem 22 further comprises a second computing module 42.

This second computing module 42 is redundant with respect to the first computing module 41 and is therefore capable of executing the same tasks as this first computing module 41 in parallel or in case of failure of the first computing module 41.

The second computing module 42 is integrated into a computer independent from that of the first computing module 41 and, like in the preceding case, takes the form of software and/or a programmable logic circuit of the FPGA type.

Like in the preceding case, the second computing module 42 is in particular capable of generating a confirmation signal of the command when the corresponding command is compatible with the operational context of the aircraft.

The third control subsystem 23 is able to acquire the confirmation signals coming from the first and second computing modules 41, 42 of the second control subsystem 22 and to select one of these signals.

According to one exemplary embodiment, the third control subsystem 23 is able to select a confirmation signal according to a logic "OR", that is to say, one or the other of the confirmation signals of the command coming from the second control subsystem 22.

The third control subsystem 23 is further able to acquire the command signal for example coming from the first calculating module 31 of the first control subsystem 21, and to consolidate this command signal with the selected confirmation signal.

The consolidation is for example done according to a logic "AND", that is to say, when the command signal and the selected confirmation signal correspond to a same command, the consolidation is done and the third control subsystem 23 is able to generate a resultant command signal.

This resultant command signal is then suitable for the commanded system 12.

Furthermore, when the second control subsystem 22 fails, that is to say, when the system 10 is in downgraded operating mode, the third control subsystem 23 is able to execute the command corresponding to the command signal without consolidation, that is to say, without using the confirmation signal.

The third control subsystem 23 is for example integrated into a computer implementing the operation of the commanded system 12. It thus assumes the form of software executable by this computer and/or of a programmable logic circuit of the FPGA type.

Figure 2:
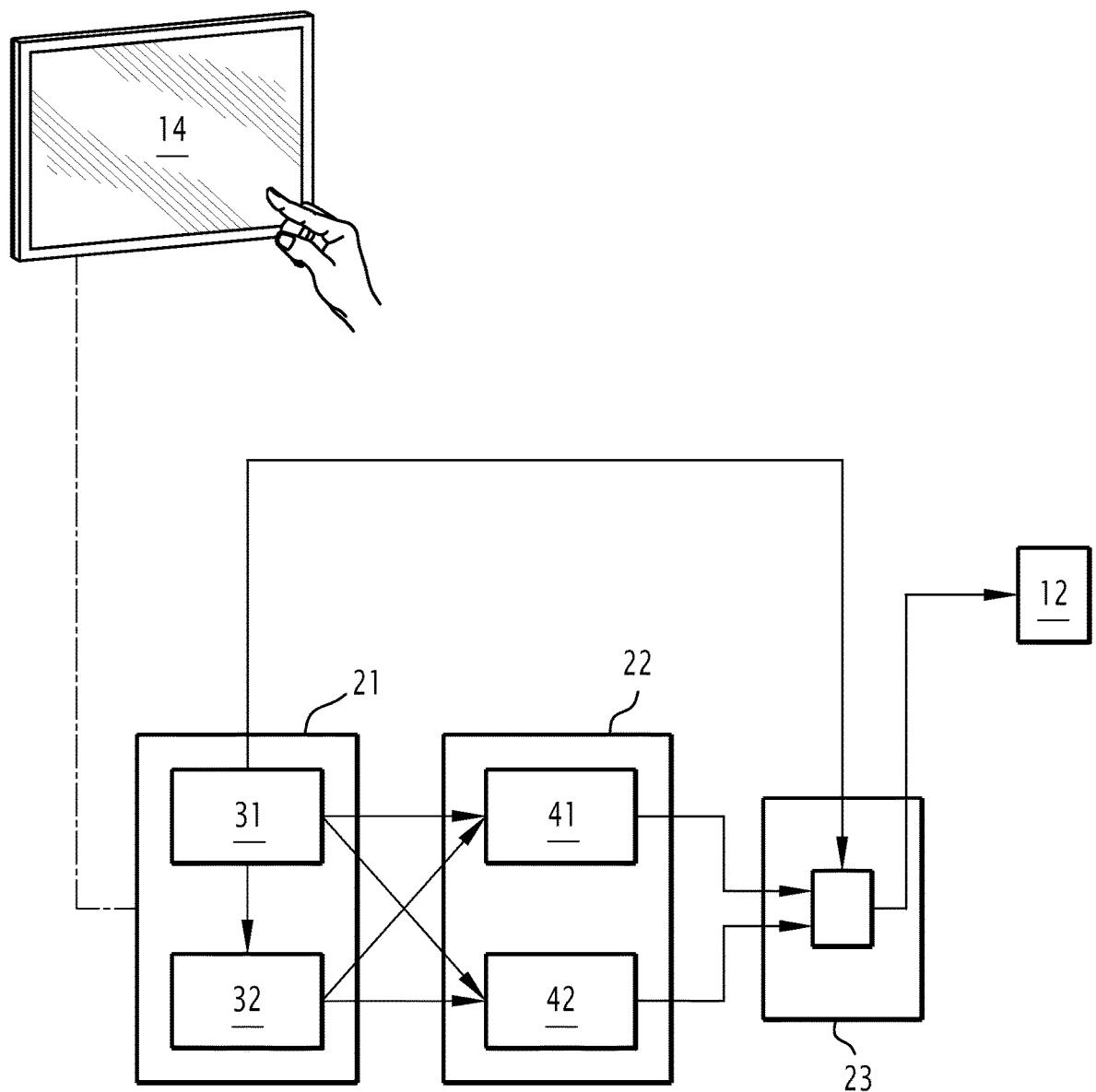
FIG. 2 is a schematic view illustrating the operation of the control system of FIG. 1.
Figure 3:
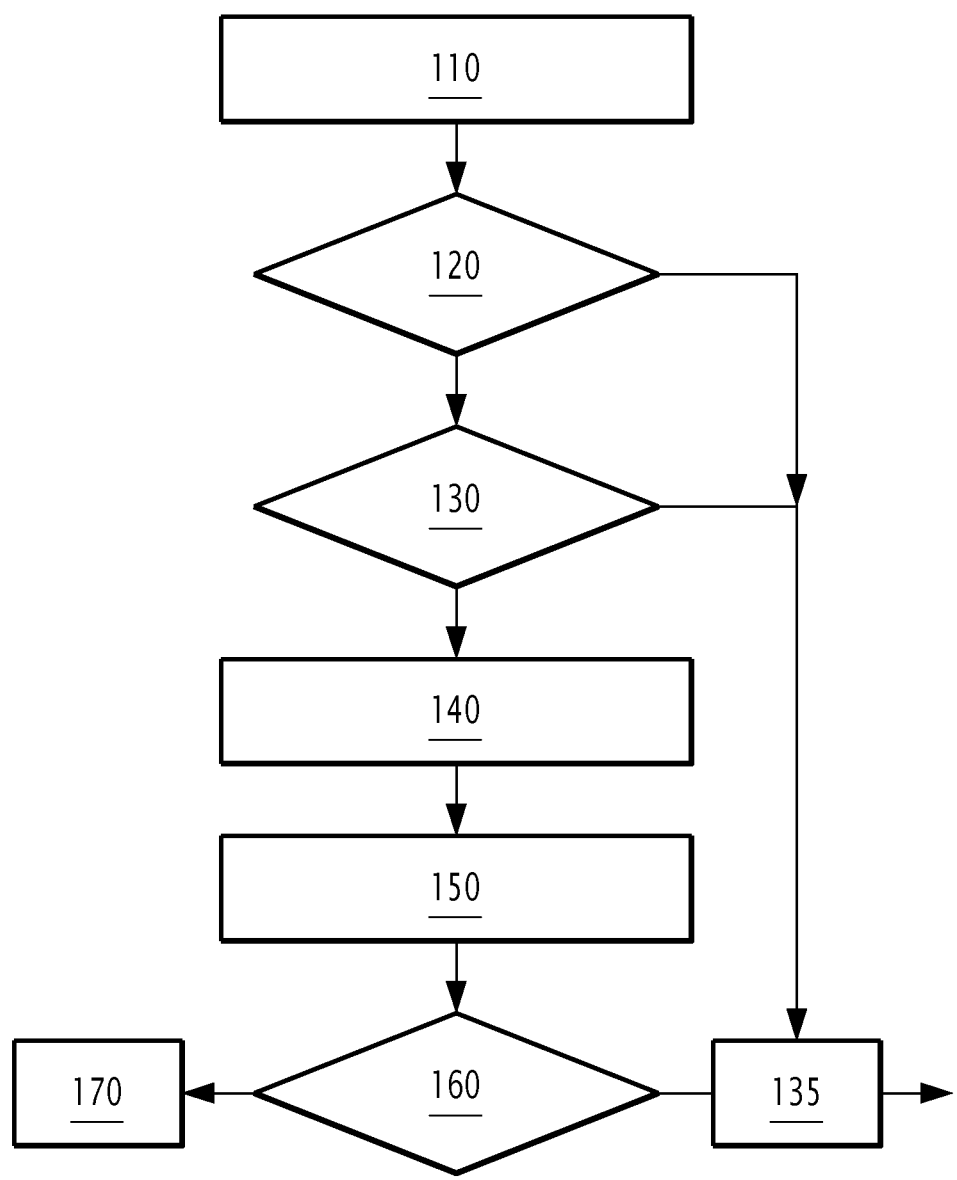
FIG. 3 is a flowchart of a testing method according to the invention, the control method being carried out by the control system of FIG. 1.

The command control method of the commanded system 12 will henceforth be explained in reference to FIG. 2 schematically illustrating the operation of the control system 10 and FIG. 3 illustrating a flowchart of this method.

Initially, the pilot interacts with the graphic interface 14 in order to command the system 12.

The corresponding interaction devices then generate interaction data relative to this interaction.

Furthermore, the current operational context of the aircraft is for example determined by corresponding surveillance systems and is acquired by the second control subsystem 22.

During the initial step of the control method 110, the computing modules 31 and 32 acquire the interaction data coming from the corresponding interaction devices. Furthermore, when the first computing module 31 is integrated into the graphic computer implementing the operation of the graphic interface 14, the second module 32 acquires, from the module 31, the display context of the graphic interface 14 in order to interpret the acquired interaction data. Otherwise, both modules acquire this context from an external module implementing the operation of the graphic interface 14.

Then, both modules 31, 32 implement, in parallel and independently of one another, a first and a second sub-step described hereinbelow.

During the first sub-step, the modules 31, 32 associate a command with the interaction data.

Thus, when these data describe a tactile movement on the screen 16, the modules 31, 32 analyze this movement in concordance with the graphic interface 14. For example, when the graphic interface 14 has a plurality of switches displayed in predetermined locations, the modules 31, 32 analyze the position of the tactile movement and associate it with one of the switches.

Furthermore, for example in order to associate a command of the "OFF" or "ON" type with this switch, the modules analyze the path of the tactile movement.

According to one exemplary embodiment, in order for the corresponding switch to be associated with this movement, its path must have a specific shape, for example as described in document WO 2017/167698 A1.

If a command was able to be associated with the corresponding interaction data, the modules 31, 32 move on to the execution of the second sub-step.

During the second sub-step, each of the computing modules 31, 32 generates a command signal corresponding to the associated command and sends it to the second control subsystem 22.

During the following step 120, each of the computing modules 41, 42 of the second control subsystem 22 acquires both of the command signals generated by the first control subsystem 21.

Then, each of the computing modules 41, 42 analyzes these signals, and when they correspond to a same command, moves to the execution of the following step 130. Otherwise, a signal prohibiting the command is generated and the command is rejected during step 135.

During step 130, each of the computing modules 41, 42 verifies the compatibility of the command with the operational context of the aircraft, as was explained above.

When the command is compatible, the modules 41, 42 go to the following step 140. Otherwise, the command is rejected during step 135.

During step 140, each of the modules 41, 42 generates a confirmation signal then corresponding to the command compatible with the operational context.

Then, each of the modules 41, 42 sends the confirmation signal to the third control subsystem 23.

It should be noted that during the execution of steps 120 to 140, if one of the computing modules 41, 42 is not available following a failure, for example, a single confirmation signal is sent to the third control subsystem 23.

It should also be noted that when none of the computing modules 41, 42 of the second control subsystem 22 are available, the control system 10 enters the downgraded operating mode and the command corresponding to the command signal is executed by the third control subsystem 23 without consolidation with a confirmation signal.

During the following step 150, the third control subsystem 23 acquires at least one of the confirmation signals.

When this subsystem 23 acquires both confirmation signals, it selects one of the two, for example the one coming from the first computing module 41.

Then, the third control subsystem 23 acquires the control system for example coming from the first computing module 31 of the first control system 21.

If the first computing module 31 is not available, the third control subsystem 23 acquires the control system coming from the or one of the second computing modules of the first control subsystem 21.

During step 160, the third control subsystem 23 consolidates the command signal and the selected confirmation signal, for example by using a logic "AND", as was previously explained.

Thus, when the two signals correspond to a same command, the third control subsystem sends this command for execution to the system 12 during step 170.

Otherwise, the command is rejected during step 135.

Figure 4:
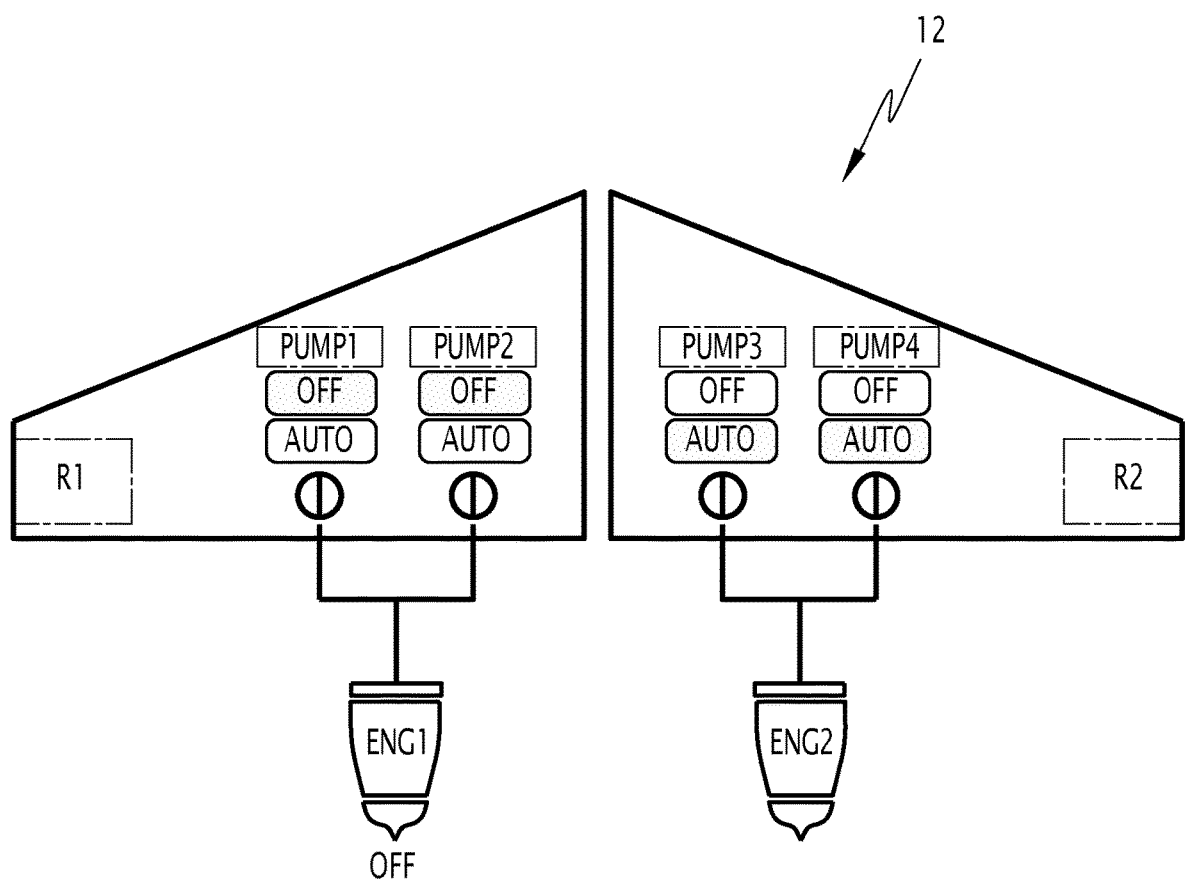
FIG. 4 is a schematic view of a system commanded by commands controlled by the control system of FIG. 1.

FIG. 4 illustrates the implementation of the method for controlling a command given by the pilot to the system 12 corresponding to a fuel supply system for the engines of the aircraft.

Thus, as is known in itself, for a twin-engine aircraft, such a system 12 for example comprises four pumps, one pair of pumps being associated with each engine. In FIG. 4, the engines are designated by references "ENG1" and "ENG2", and the pumps are designated by references "PUMP1" to "PUMP4".

Each pump "PUMP1" to "PUMP4" is able to operate in "AUTO" state, in which it supplies the corresponding engine from one of the tanks R1 or R2, or in "OFF" state, in which it is off.

In the example shown in FIG. 4, the aircraft is taking off with a failure or a fire in the engine ENG1. The pumps "PUMP1" and "PUMP2" are therefore in the OFF state. This defines an operational context of the aircraft.

It is further assumed that the command associated by the first control subsystem 21 following an interaction of the pilot with the graphic interface 14 consists of turning off the pumps PUMP3 and PUMP4, that is to say, placing them in the "OFF" state.

This command will be rejected during step 135 of the method described above following the verification of its compatibility with the operational context of the aircraft during step 130.

Indeed, the cutoff of the pumps PUMP3 and PUMP4 would lead to the loss of the engine "ENG2" remaining at takeoff, which would lead to the loss of the aircraft, that is to say, an event of type "CATASTROPHIC". The command is therefore not compatible with the current operational context and is rejected.

One can then see that the present invention has a certain number of advantages.

First of all, the invention makes it possible to command a system via a graphic interface while guaranteeing a very high operating safety level.

Thus, for the avionics field, when a command performed using an interaction medium has a "HAZARDOUS" or "CATASTROPHIC" integrity level, the invention makes it possible to keep this level during the processing of this command up to the system for which it is intended.

This then allows the use of a graphic interface to command each on-board system and makes it possible to virtualize these commands in the appropriate form.

Furthermore, a high availability of the control system according to the invention can further be achieved by adapting the number of computers used to implement the operation of the first and second control subsystems.

The invention claimed is:

1. A command control system of a commanded system commanded via a graphic interface by an operator, the commanded system operating in a critical environment, the control system comprising:

a first control subsystem comprising a first computing module able to acquire interaction data describing the interactions of the operator related to the graphic interface, associate these interaction data with a command, and generate a command signal corresponding to this command;

a second control subsystem comprising a first computing module able to acquire the command signal, verify the compatibility of the command corresponding to the command signal with an operational context defining an operation of the critical environment with a high operating safety objective in said critical environment, and, when the command is compatible with the operational context, generate a confirmation signal corresponding to this command; and a third control subsystem able to acquire the command signal and the confirmation signal, and to consolidate the signals in order to generate a resultant command signal intended to command the commanded system;

wherein the second control subsystem further comprises a second computing module independent of the first computing module and able to execute the same tasks as the first computing module of this second control subsystem, the second computing module of the second control subsystem then being able to generate another confirmation signal.

2. The control system according to claim 1, wherein the first control subsystem further comprises one or several second computing modules, the or each second computing module being able to acquire said interaction data, associate these interaction data with a command, and generate another command signal corresponding to this command.

3. The control system according to claim 2, wherein the first computing module of the second control subsystem is able to acquire all of the command signals generated by the first control subsystem, and when these command signals correspond to a same command, to verify the compatibility of this command with the operational context.

4. The control system according to claim 1, wherein the third control subsystem is able to acquire all of the confirmation signals coming from the second control subsystem and to select one of these confirmation signals to consolidate it with the command signal.

5. The control system according to claim 1, wherein the third control subsystem is able to generate the resultant command signal when the command signal and the confirmation signal to be consolidated correspond to a same command.

6. The control system according to claim 1, wherein, in case of failure of the second control subsystem, the third control subsystem is able to generate the resultant command signal from the acquired command signal, without consolidation with a confirmation signal.

7. The control system according to claim 1, wherein the first computing module of the first control subsystem is integrated into a computer implementing the operation of the graphic interface.

8. The control system according to claim 1, wherein the third control subsystem is integrated in the commanded system.

9. The control system according to claim 1, wherein at least one interaction of the operator in connection with the graphic interface is done on a screen displaying this graphic interface.

10. The control system according to claim 1, wherein the commanded system is a system on board an aircraft.

11. The control system according to claim 10, wherein the operational context is defined as a function of the flight phase of the aircraft and operating states of the on board systems.

12. A command control method for a commanded system commanded via a graphic interface by an operator, the commanded system operating in a critical environment, the control method being implemented by a control system according to claim 1 and comprising:

acquiring interaction data describing each interaction of the operator with the graphic interface, associating these interaction data with a command and generating a command signal corresponding to this command;

verifying the compatibility of the command corresponding to the command signal with an operational context defining the operation of the critical environment;

when the command is compatible with the operational context, generating a confirmation signal corresponding to this command; and consolidating the command signal and the confirmation signal in order to generate a resultant command signal intended to command the commanded system.

* * * * *